United States Patent

Davis

[11] Patent Number: 5,836,327
[45] Date of Patent: Nov. 17, 1998

[54] UMBRELLA HOLDER

[76] Inventor: Gary A. Davis, 203 London La., Glenn Heights, Tex. 75154

[21] Appl. No.: 906,577

[22] Filed: Aug. 5, 1997

[51] Int. Cl.⁶ ........................................................ A45B 3/00
[52] U.S. Cl. .............................. 135/16; 248/515; 248/540
[58] Field of Search ..................... 135/16, 161; 248/514, 248/515, 534, 540, 541

[56] References Cited

U.S. PATENT DOCUMENTS

| | | | |
|---|---|---|---|
| 122,370 | 1/1872 | Doolittle | 248/540 |
| 840,241 | 1/1907 | NootBaar | 248/515 |
| 923,596 | 6/1909 | Staples . | |
| 2,822,143 | 2/1958 | Johansen | 248/514 X |
| 3,050,280 | 8/1962 | Regan | 248/40 |
| 3,148,851 | 9/1964 | Condon | 248/515 |
| 3,765,434 | 10/1973 | Riggs | 135/16 X |
| 3,904,161 | 9/1975 | Scott | 248/43 |
| 4,023,582 | 5/1977 | Buzzella et al. | 135/20 R |
| 4,318,567 | 3/1982 | Guthier | 297/184 |
| 4,809,724 | 3/1989 | Fuser | 135/16 |
| 5,000,210 | 3/1991 | Worthington, Jr. | 135/90 |
| 5,255,954 | 10/1993 | Rogers | 297/184.16 |
| 5,518,218 | 5/1996 | Leonard | 248/530 |

*Primary Examiner*—Creighton Smith
*Attorney, Agent, or Firm*—Joseph N. Breaux

[57] ABSTRACT

An umbrella holder comprising a clamp mechanism; a right/left angular adjustment mechanism, a forward/rearward angular adjustment mechanism; a length adjustment mechanism; and an umbrella shaft and handle securing mechanism. The clamp mechanism includes an upper and lower jaw member, an upper and lower resilient clamp pad, and a clamp screw mechanism. Each upper and lower jaw member is provided with a clamp channel that is covered with the upper or lower resilient clamp pad, respectively. The clamp channels are oriented in opposed relationship and the clamp screw mechanism threadable engages the lower jaw member and rotatably engages the upper jaw member in a manner such that rotation of the clamp screw mechanism causes the upper and lower jaw to be forced together or apart depending on the direction of rotation of the clamp screw mechanism. The umbrella shaft and handle securing mechanism includes a shaft channel clamp and a handle strap assembly positioned below the shaft channel clamp. The shaft channel clamp includes a channel member having an elongated channel that is covered with resilient padding and sized to receive therein a portion of the shaft of an umbrella. A compression member rotatably connected to a shaft clamp screw mechanism is positioned within the elongated channel. The compression member has a resilient pad covering the compression surface thereof. The compression member is preferably elongated and can also have a curved channelized surface if desired. The handle strap assembly includes a flexible strap having an adjustable securing mechanism.

18 Claims, 2 Drawing Sheets

UMBRELLA HOLDER

TECHNICAL FIELD

This application claims the benefits under 35 U.S.C. 119(e) of earlier filed provisional application Ser. No. 60/024,944, filed Aug. 30, 1996. The present invention relates to holding and positioning devices and more particularly to an umbrella holder for holding and positioning an umbrella or the like including a clamp mechanism having padded jaws for clamping the umbrella holder to a support such as a chair, lawn mower, golf cart, etc.; three angular adjustment mechanisms for adjusting the angle of the umbrella to a desired angle; a length adjustment mechanism for adjusting the height of the umbrella to a desired height; and an umbrella shaft and handle securing mechanism for securing an umbrella to the umbrella holder.

BACKGROUND OF INVENTION

It is often desirable to have an umbrella to provide a welcome shield from the sun or rain. However, it is not often possible or practical, when engaged in activities, to hold the umbrella in the desired position. It would be a benefit, therefore, to have an umbrella holder that could be affixed to the shaft and handle of an existing umbrella that could be secured to a nearby structure and positioned at a desired height and angle to afford a user protection from the weather. It would be further desirable if the umbrella holder were lightweight and securable to a variety of umbrella shaft and handle configurations and sizes.

SUMMARY OF INVENTION

It is thus an object of the invention to provide an umbrella holder that is securable to the shaft and handle of an existing umbrella that includes a mechanism for securing the umbrella holder to a variety of support structures and that is provided with angular and length positioning mechanisms to allow the user to position the umbrella at a desired angle and height.

It is a further object of the invention to provide an umbrella holder that is lightweight.

It is a still further object of the invention to provide an umbrella holder that includes an umbrella shaft and handle securing mechanism that can be used to secure a variety of umbrella shaft and handle configurations to the umbrella holder.

It is a still further object of the invention to provide an umbrella holder that accomplishes all or some of the above objects in combination.

Accordingly, an umbrella holder is provided. The umbrella holder comprises a clamp mechanism; a right/left angular adjustment mechanism, a forward/rearward angular adjustment mechanism; a length adjustment mechanism; and an umbrella shaft and handle securing mechanism.

The clamp mechanism includes an upper and lower jaw member, an upper and lower resilient clamp pad, and a clamp screw mechanism. Each upper and lower jaw member is provided with a clamp channel that is covered with the upper or lower resilient clamp pad, respectively. Each upper and lower clamp pad is constructed from resilient rubber or plastic and also extends over a planar section of the upper and lower jaw member to provide cushioning when upper and lower jaws are clamped onto a table edge or other square or flat surface. The clamp channels are oriented in opposed relationship and the clamp screw mechanism threadable engages the lower jaw member and rotatably engages the upper jaw member in a manner such that rotation of the clamp screw mechanism causes the upper and lower jaw to be forced together or apart depending on the direction of rotation of the clamp screw mechanism.

The left/right and forward/rearward angular adjustment mechanisms can be any mechanism known in the art that allows the angle of two adjoining members to be selected and held by a locking mechanism. The angular adjustment mechanism is preferably a fork assembly pivotally mounted on a central pivot member that includes a screw mechanism that can be tightened to secure the two members together at the desired angle. The length adjustment mechanism can be any mechanism that allows the length of an assembly to be varied and locked into place. The length adjustment mechanism is preferably a telescoping assembly, comprising a rod member slidably disposed within a tubular member, and a compression fitting fitted about the tubular member to compress the tubular member about the rod member and hold the rod member in fixed relationship to the tubular member.

The umbrella shaft and handle securing mechanism includes a shaft channel clamp and a handle strap assembly positioned below the shaft channel clamp. The shaft channel clamp includes a channel member having an elongated channel that is covered with resilient padding and sized to receive therein a portion of the shaft of an umbrella. A compression member, rotatably connected to a shaft clamp screw mechanism, is positioned within the elongated channel. Rotation of the clamp screw mechanism causes the compression member to move against an opposed sidewall that partially defines the elongated channel. The compression member has a resilient pad covering the compression surface thereof. The compression member is preferably elongated and can also have a curved channelized surface if desired to conform to the shaft of the umbrella and apply even pressure thereagainst. The handle strap assembly includes a flexible strap having an adjustable securing mechanism. The adjustable securing mechanism preferably has a hook and pile fastener.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
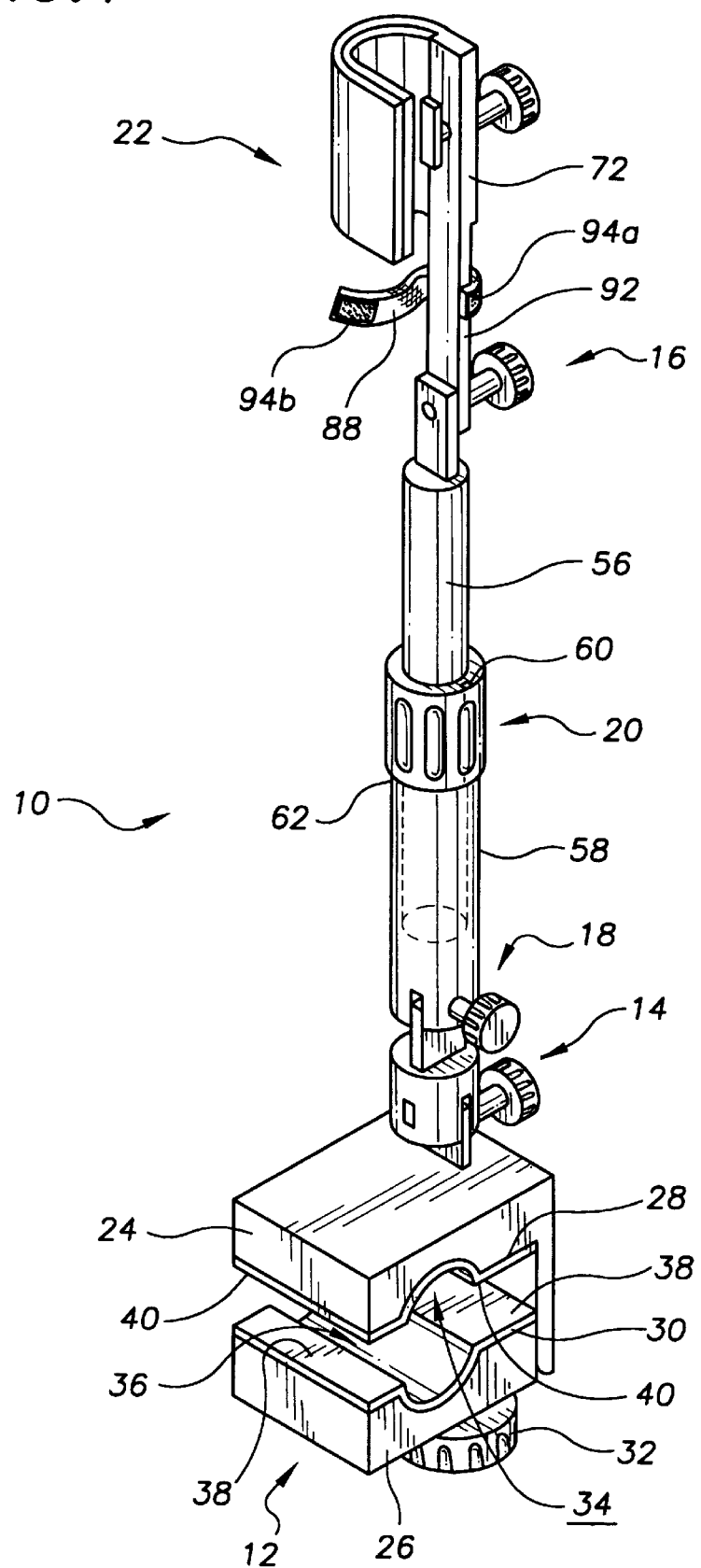
FIG. 1 is a perspective view of an exemplary embodiment of the umbrella holder of the present invention showing the clamp mechanism, the three angular adjustment mechanisms, the length adjustment mechanism and the umbrella shaft and handle securing mechanism.

FIG. 1 shows an exemplary embodiment of the umbrella holder of the present invention generally designated by the numeral 10. Umbrella holder 10 includes a clamp mechanism, generally designated by the numeral 12; a first right/left angular adjustment mechanism, generally designated by the numeral 14; a second left/right angular adjustment mechanism, generally designated by the numeral 16; a forward/rearward angular adjustment mechanism, generally designated by the numeral 18; a length adjustment mechanism, generally designated by the numeral 20; and an umbrella shaft and handle securing mechanism, generally designated by the numeral 22.

Clamp mechanism 12 includes an upper and lower jaw member 24,26; an upper and lower resilient clamp pad 28,30; and a clamp screw mechanism 32. Each upper and lower jaw member 24,26 is provided with a clamp channel 34,36 that is covered with an upper or lower resilient clamp pad 28,30, respectively. Each upper and lower clamp pad 28,30 is constructed from resilient rubber and extends over identical planar sections 38,40 (only 38 shown) of upper and lower jaw members 24,26.

Figure 2:
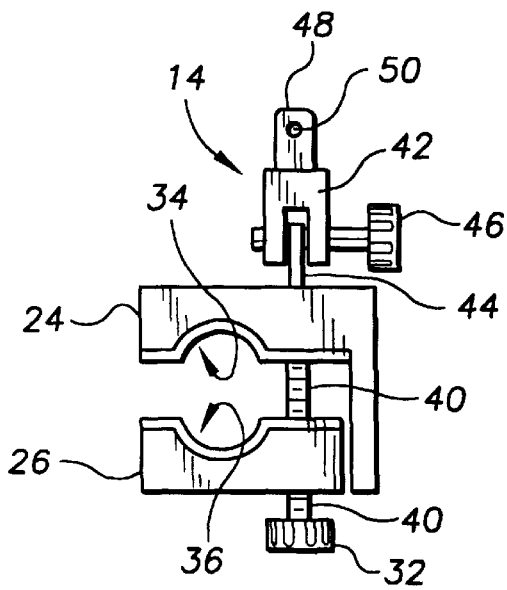
FIG. 2 is a plan side view of the clamp mechanism showing the upper and lower jaw members, the upper and lower resilient clamp pads, the clamp screw mechanism, and the first right/left angular adjustment mechanism.

With reference to FIG. 2, clamp channels 34,36 are oriented in opposed relationship and a threaded member 40 of clamp screw mechanism 32 threadably engages lower jaw member 26 and rotatably engages upper jaw member 28 in a manner such that rotation of the clamp screw mechanism causes upper and lower jaw members 24,26 to be forced together or apart depending on the direction of rotation of clamp screw mechanism 32.

Also shown in FIG. 2 is first left/right angular adjustment mechanism 14. First left/right angular adjustment mechanism 14 includes a first fork assembly 42 pivotally mounted on a first central pivot member 44. First central pivot member 44 is integrally formed with a top surface of upper jaw member 24. A first angular adjustment screw mechanism 46 is provided to secure first fork assembly 42 and first central pivot member 44 in fixed relationship at a desired angle when tightened. The second central pivot member 48 of forward/rearward angular adjustment mechanism 18 is integrally formed with a top surface of first fork assembly 42. First and second central pivot members 44,48 are substantially identical rectangular sections having a screw mechanism aperture 50 formed therethrough.

Figure 3:
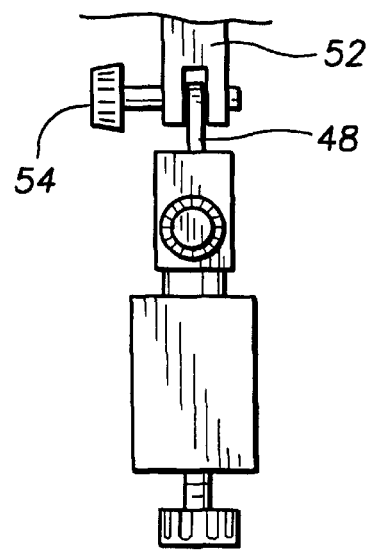
FIG. 3 is a rear plan view of the clamp mechanism, the first right/left angular adjustment mechanism, and the forward/rearward angular adjustment mechanism.

With reference to FIG. 3, forward/rearward angular adjustment mechanism 18 includes a second fork assembly 52 pivotally mounted on second central pivot member 48. A second angular adjustment screw mechanism 54 is provided to secure second fork assembly 52 and second central pivot member 48 in fixed relationship at a desired angle when tightened.

With reference once again to FIG. 1, in this embodiment length adjustment mechanism 20 includes a telescoping assembly comprising a rod member 56 slidably disposed within a tubular member 58. Tubular member 58 is integrally formed with second fork assembly 52. A compression fitting 60 is fitted about an uppermost end 62 of tubular member 58 to compress tubular member 58 about rod member 56 and hold rod member 56 in fixed relationship to tubular member 58 when compression fitting 60 is tightened.

Figure 4:
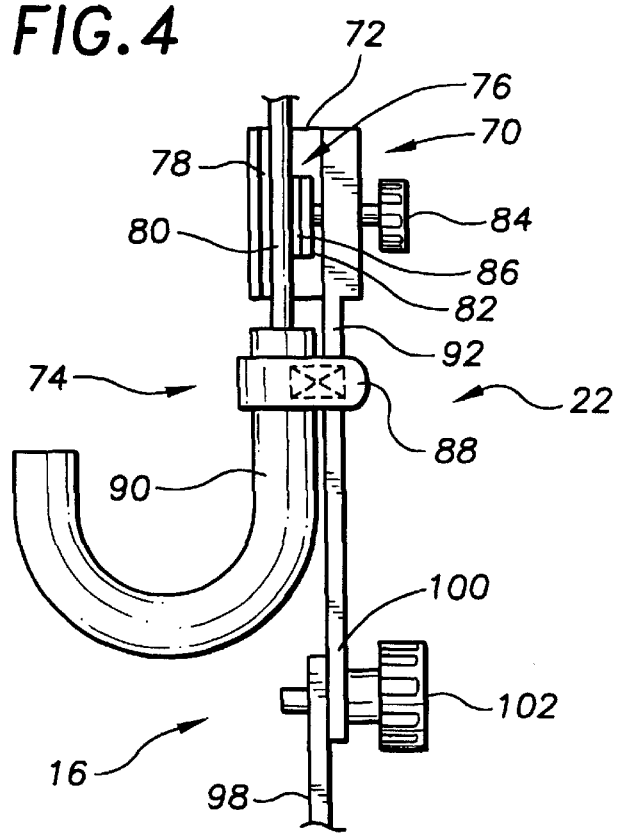
FIG. 4 is a plan view of the second left/right angular adjustment mechanism and the umbrella shaft and handle securing mechanism with a representative umbrella shaft and handle secured therein. The umbrella shaft and handle securing mechanism includes the shaft channel clamp mechanism and the handle strap assembly.

With reference to FIG. 4, umbrella shaft and handle securing mechanism 22 includes a shaft channel clamp assembly, generally designated 70; and a handle strap assembly, generally designated by the numeral 74. Handle strap assembly 74 is positioned below shaft channel clamp 70. Shaft channel clamp 70 includes a channel member 72 having an elongated channel 76 that is covered with resilient rubber padding 78. Channel 76 is sized to receive therein a portion of the shaft 80 of an umbrella. A compression member 82 is rotatably connected to a shaft clamp screw mechanism 84 and is positioned within channel 76. Rotation of clamp screw mechanism 84 causes compression member 82 to move against an opposed sidewall and compress and hold shaft portion 80 of the umbrella therebetween. A resilient pad 86 covers the compression surface of compression member 82 to reduce damage to shaft portion 80 when compression member 82 is compressed thereagainst.

Handle strap assembly 74 includes a flexible strap 88 that is securable about the handle 90 of an umbrella. With reference to FIG. 1, flexible strap 88 is secured to a support member 92 that is integrally formed with channel member 72. In this embodiment, flexible strap 88 includes a hook and pile fastener 94a,94b to provide an adjustable securing mechanism for securing a variety of handle sizes.

With reference back to FIG. 4, second left/right angular adjustment mechanism 16 includes a first adjacent pivot member 98 that is integrally formed with a top end of rod member 56 (FIG. 1) and a second adjacent pivot member 100 that is integrally formed with support member 92. First and second adjacent pivot members 98,100 are each provided with screw mechanism apertures (not shown) that are concentrically aligned. A third screw mechanism 102 threadably engages the screw mechanism aperture of first adjacent pivot member 98 and rotatably passes through the screw mechanism aperture of second adjacent pivot member 100. Tightening screw mechanism 102 locks first and second adjacent pivot members 98,100 in fixed relationship with each other.

Use of umbrella holder 10 is now described with general reference to FIGS. 1–4. Umbrella holder 10 is secured to a convenient support structure such as the tubular arm of a chair by positioning the tubular arm of the chair between upper and lower jaw members 24,26 and tightening clamp screw mechanism 32 until the tubular arm of the chair is secured within upper and lower clamp channels 34,36. An umbrella is then secured to umbrella holder 10 by securing the shaft and handle as previously described using umbrella shaft and handle securing mechanism 22. The angle and height of the umbrella can then be adjusted as desired using first and second left/right angular adjustment mechanisms 14,16; forward/rearward angular adjustment mechanism 18; and height adjustment mechanism 20 also as previously described.

It can be seen from the preceding description that an umbrella holder has been provided that is securable to the shaft and handle of an existing umbrella; that includes a mechanism for securing the umbrella holder to a variety of support structures; that is provided with angular and length positioning mechanisms to allow the user to position the umbrella at a desired angle and height; that is lightweight; and that includes an umbrella shaft and handle securing mechanism that can be used to secure a variety of umbrella shaft and handle configurations to the umbrella holder.

It is noted that the embodiment of the umbrella holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A umbrella holder comprising:

a clamp mechanism;

a right/left angular adjustment mechanism;

a forward/rearward angular adjustment mechanism;

a length adjustment mechanism; and an umbrella shaft and handle securing mechanism;

said clamp mechanism including an upper and lower jaw member, an upper and lower resilient clamp pad, and a clamp screw mechanism, each said upper and lower jaw member being provided with a clamp channel that is covered with said upper or lower resilient clamp pad, respectively;

said left/right and forward/rearward angular adjustment mechanisms each including a fork member pivotally mounted on a central pivot member that includes a screw mechanism that can be tightened to secure said fork member and said central pivot member together at a desired angle;

said length adjustment mechanism including a telescoping assembly including a rod member slidably disposed within a tubular member, and a compression fitting fitted about said tubular member to compress said tubular member about said rod member and hold said rod member in fixed relationship to said tubular member;

said umbrella shaft and handle securing mechanism including a shaft channel clamp and a handle strap assembly positioned below said shaft channel clamp, said shaft channel clamp including a channel member having an elongated channel that is covered with resilient padding and sized to receive therein a portion of a shaft of an umbrella and a compression member, rotatably connected to a shaft clamp screw mechanism, positioned within said elongated channel, rotation of said clamp screw mechanism causing said compression member to move against an opposed sidewall that partially defines said elongated channel.

2. The umbrella holder of claim 1, wherein:

said clamp channels are oriented in opposed relationship.

3. The umbrella holder of claim 1, wherein:

said compression member has a resilient pad covering a compression surface thereof, said compression member being elongated and having a curved channelized surface.

4. The umbrella holder of claim 1 wherein:

said clamp screw mechanism threadably engages said lower jaw member and rotatably engages said upper jaw member in a manner such that rotation of said clamp screw mechanism causes said upper and lower jaw to be forced in a desired direction corresponding to a direction of rotation of said clamp screw mechanism.

5. The umbrella holder of claim 1 wherein:

each said upper and lower clamp pad is constructed from a resilient material and extends over a planar section of said upper and lower jaw member to provide cushioning when upper and lower jaws are clamped.

6. The umbrella holder of claim 1 wherein:

said handle strap assembly includes a flexible strap having an adjustable securing mechanism, said adjustable securing mechanism including a hook and pile fastener.

7. The umbrella holder of claim 2, wherein:

said compression member has a resilient pad covering a compression surface thereof, said compression member being elongated and having a curved channelized surface.

8. The umbrella holder of claim 2 wherein:

said clamp screw mechanism threadably engages said lower jaw member and rotatably engages said upper jaw member in a manner such that rotation of said clamp screw mechanism causes said upper and lower jaw to be forced in a desired direction corresponding to a direction of rotation of said clamp screw mechanism.

9. The umbrella holder of claim 2 wherein:

each said upper and lower clamp pad is constructed from a resilient material and extends over a planar section of said upper and lower jaw member to provide cushioning when upper and lower jaws are clamped.

10. The umbrella holder of claim 2 wherein:

said handle strap assembly includes a flexible strap having an adjustable securing mechanism, said adjustable securing mechanism including a hook and pile fastener.

11. The umbrella holder of claim 7 wherein:

said clamp screw mechanism threadably engages said lower jaw member and rotatably engages said upper jaw member in a manner such that rotation of said clamp screw mechanism causes said upper and lower jaw to be forced in a desired direction corresponding to a direction of rotation of said clamp screw mechanism.

12. The umbrella holder of claim 7 wherein:

each said upper and lower clamp pad is constructed from a resilient material and extends over a planar section of said upper and lower jaw member to provide cushioning when upper and lower jaws are clamped.

13. The umbrella holder of claim 7 wherein:

said handle strap assembly includes a flexible strap having an adjustable securing mechanism, said adjustable securing mechanism including a hook and pile fastener.

14. The umbrella holder of claim 11 wherein:

each said upper and lower clamp pad is constructed from a resilient material and extends over a planar section of said upper and lower jaw member to provide cushioning when upper and lower jaws are clamped.

15. The umbrella holder of claim 11 wherein:

said handle strap assembly includes a flexible strap having an adjustable securing mechanism, said adjustable securing mechanism including a hook and pile fastener.

16. The umbrella holder of claim 14 wherein:

said handle strap assembly includes a flexible strap having an adjustable securing mechanism, said adjustable securing mechanism including a hook and pile fastener.

17. The umbrella holder of claim 8 wherein:

each said upper and lower clamp pad is constructed from a resilient material and extends over a planar section of said upper and lower jaw member to provide cushioning when upper and lower jaws are clamped.

18. The umbrella holder of claim 8 wherein:

said handle strap assembly includes a flexible strap having an adjustable securing mechanism, said adjustable securing mechanism including a hook and pile fastener.

\* \* \* \* \*